(No Model.) 6 Sheets—Sheet 1.
O. JONES.
SPEED GOVERNOR FOR MARINE ENGINES.
No. 564,079. Patented July 14, 1896.
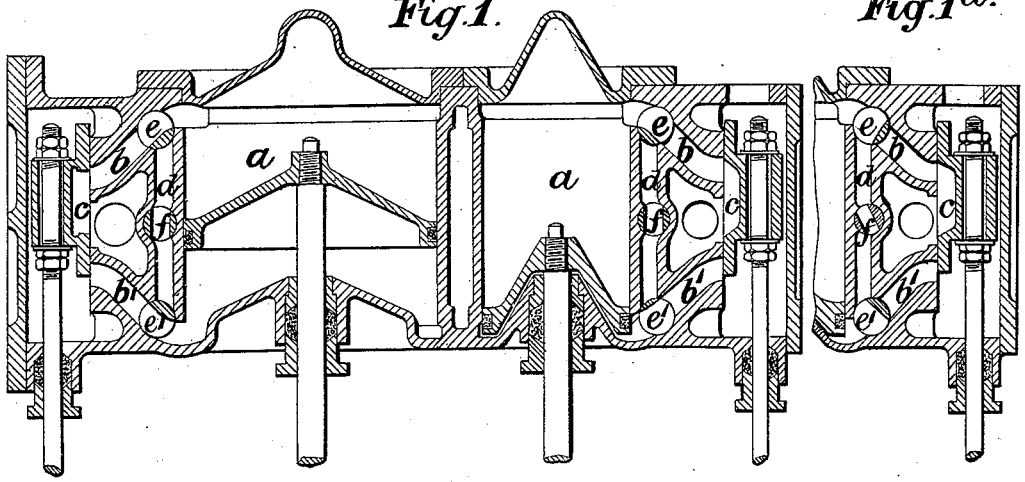
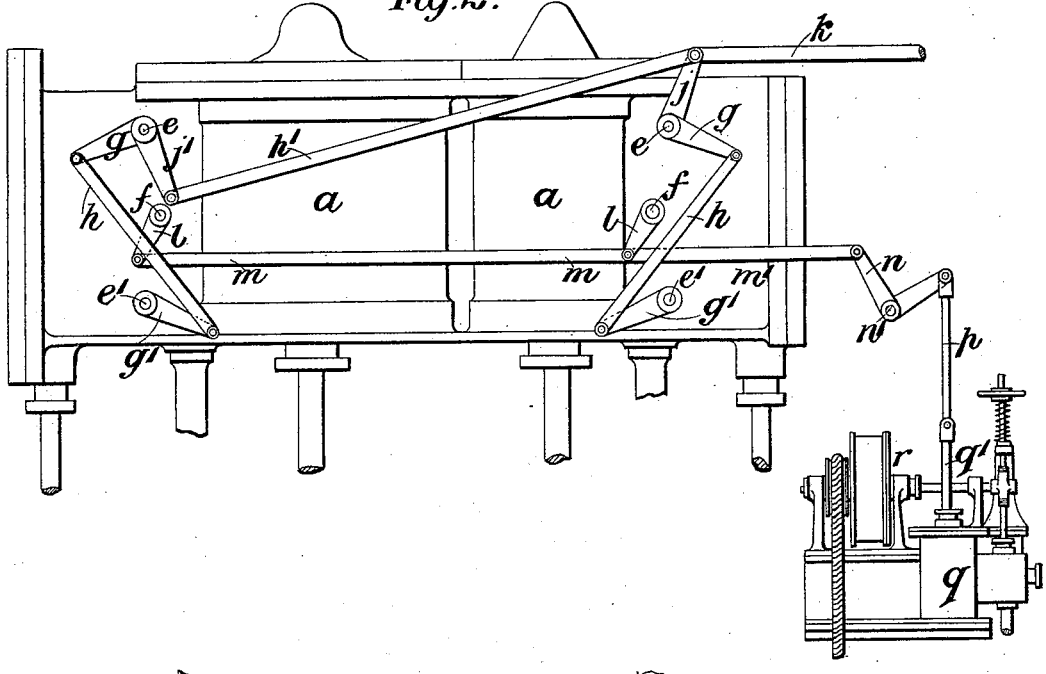
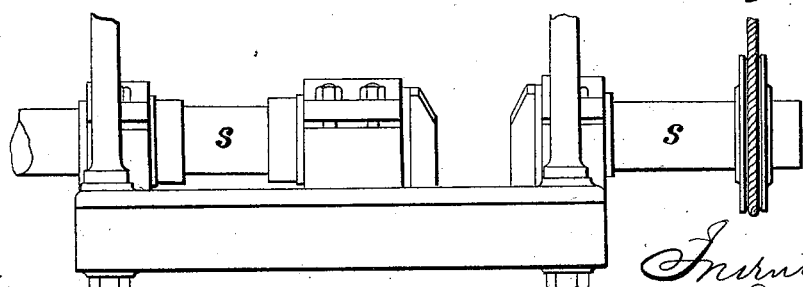

(No Model.) 6 Sheets—Sheet 2.
O. JONES.
SPEED GOVERNOR FOR MARINE ENGINES.
No. 564,079. Patented July 14, 1896.
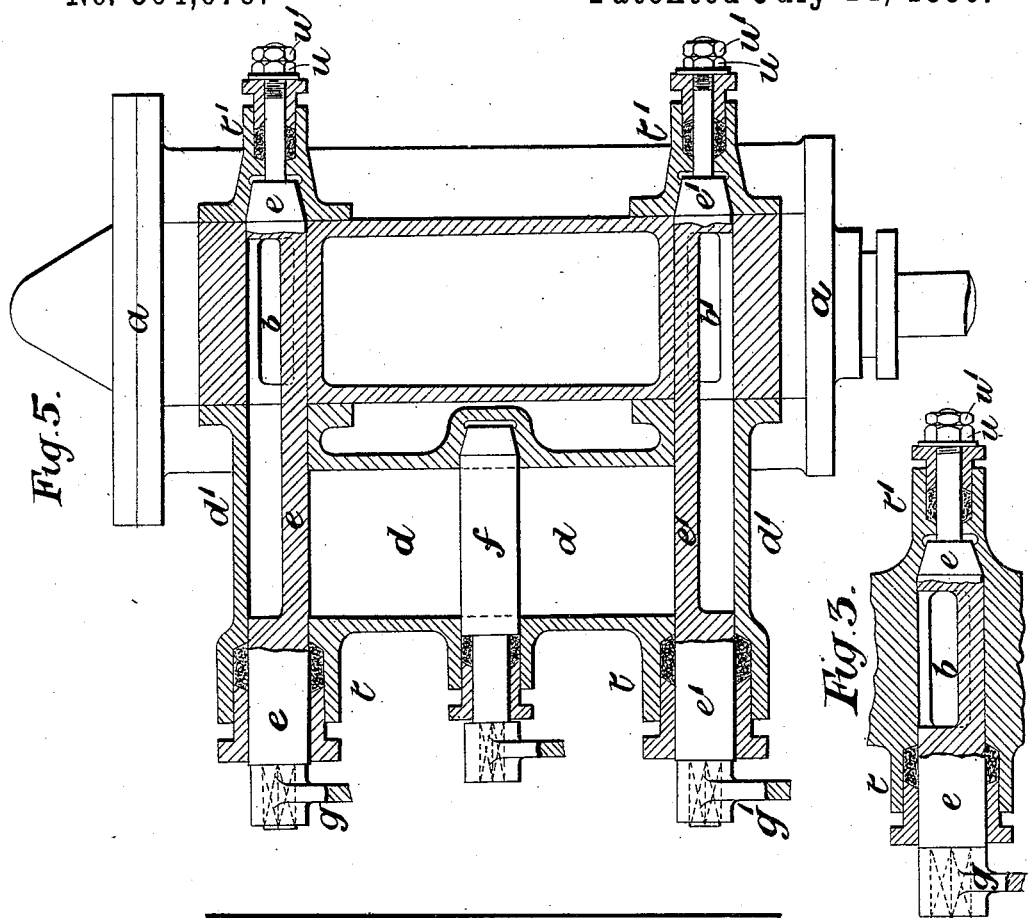
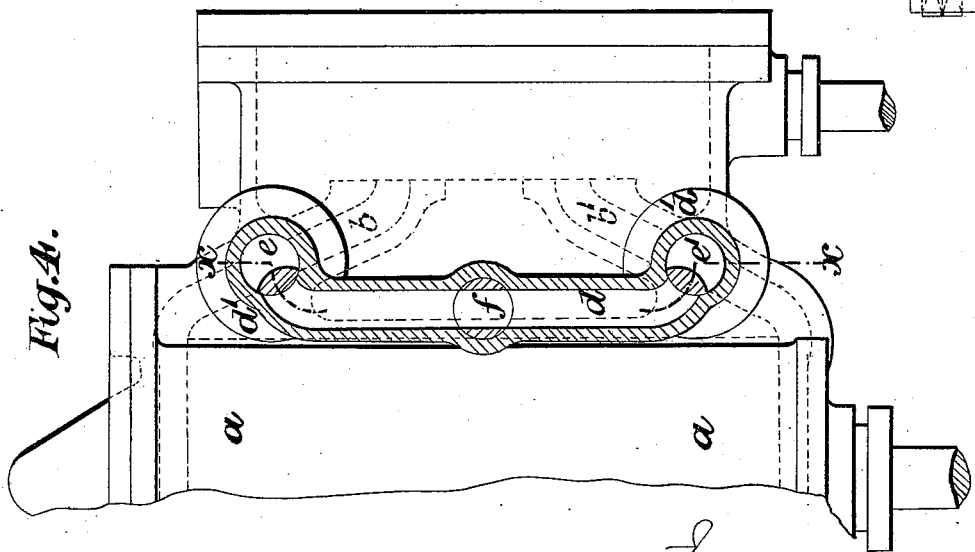

(No Model.) 6 Sheets—Sheet 3.

O. JONES.
SPEED GOVERNOR FOR MARINE ENGINES.

No. 564,079. Patented July 14, 1896.

Witnesses:
Inventor: Owen Jones (No Model.) 6 Sheets—Sheet 4.
O. JONES.
SPEED GOVERNOR FOR MARINE ENGINES.
No. 564,079. Patented July 14, 1896.
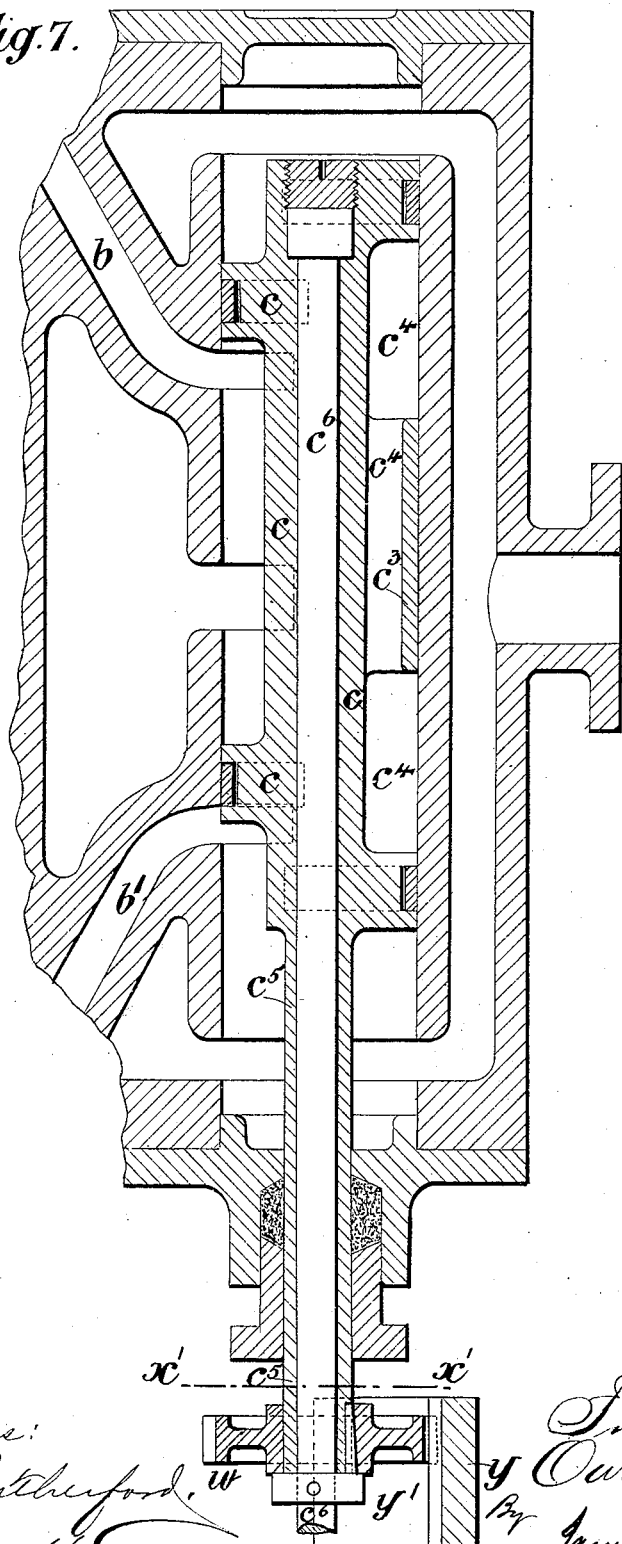

(No Model.) 6 Sheets—Sheet 5.
O. JONES.
SPEED GOVERNOR FOR MARINE ENGINES.

No. 564,079. Patented July 14, 1896.

(No Model.) 6 Sheets—Sheet 6.

O. JONES.
SPEED GOVERNOR FOR MARINE ENGINES.

No. 564,079. Patented July 14, 1896.

UNITED STATES PATENT OFFICE.

OWEN JONES, OF LONDON, ENGLAND.

SPEED-GOVERNOR FOR MARINE ENGINES.

SPECIFICATION forming part of Letters Patent No. 564,079, dated July 14, 1896.

Application filed March 26, 1892. Serial No. 426,592. (No model.) Patented in England December 6, 1890, No. 19,961.

*To all whom it may concern:*

Be it known that I, OWEN JONES, a citizen of the United States, residing at London, England, have invented an Improved Speed-Governor for Marine Engines, (for which I have obtained a patent in Great Britain, No. 19,961, bearing date December 6, 1890,) of which the following is a specification.

My invention relates to an improved apparatus for regulating or governing the speed of engines, and the chief object of my said invention is to provide in a more efficient manner than heretofore for preventing or diminishing what is termed the "racing" of marine engines.

To this end the invention consists in the novel features of construction and combination of parts hereinafter described, and set forth in the claims.

In the accompanying drawings I have shown how my said invention may be conveniently and advantageously carried into practice.

Figure 6:
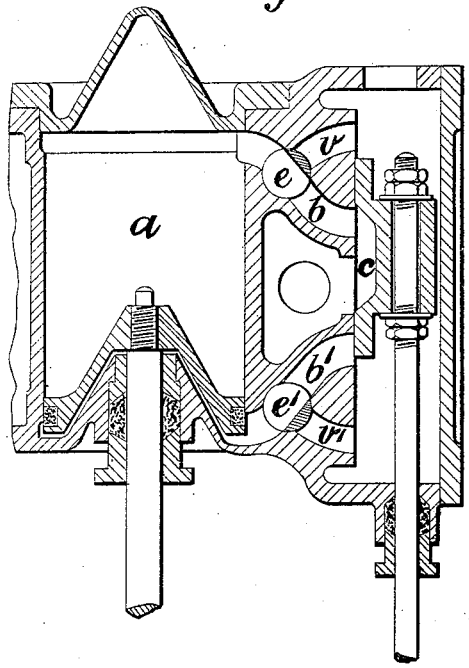
Figure 9:
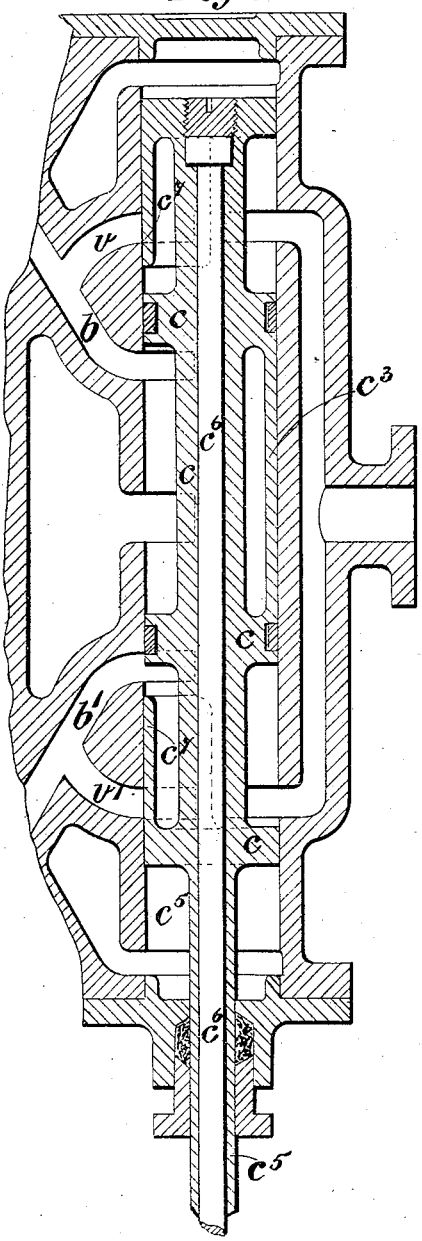
Figure 8:
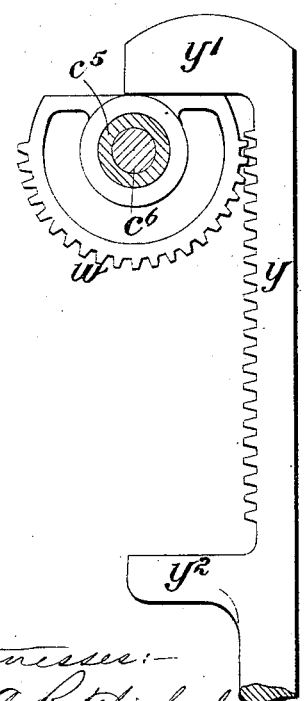
Figure 10:
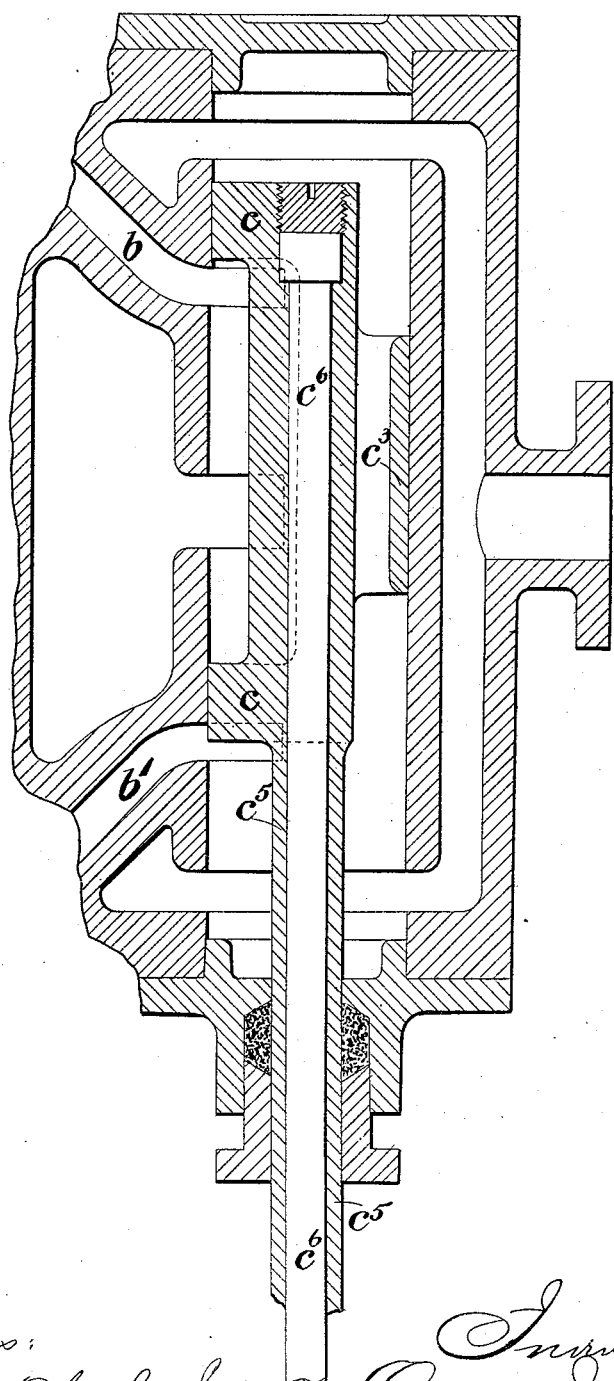
Figure 11:
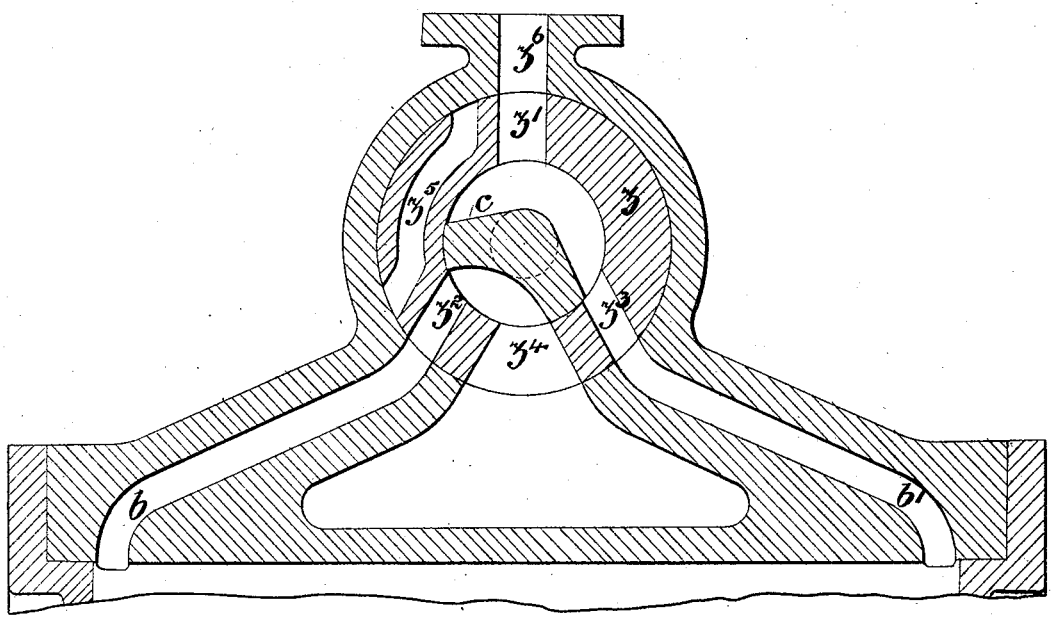
Figure 12:
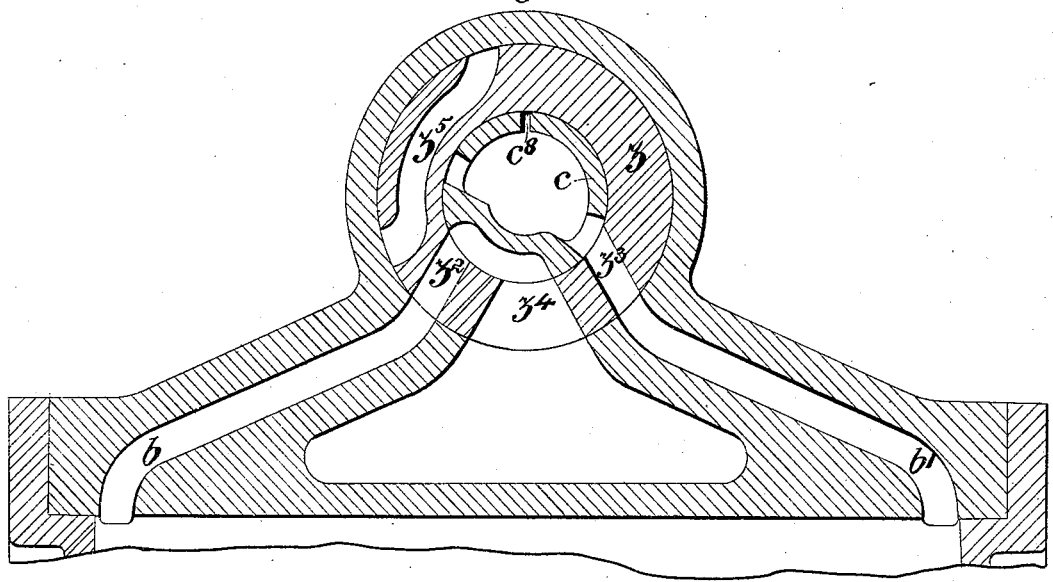

Figure 1 is a vertical longitudinal central section of part of a compound engine having my improvements applied thereto. Fig. 1$^a$ is a vertical longitudinal central section showing the valves in a different position. Fig. 2 is a side elevation illustrating means for operating the said valves. Fig. 3 is a sectional elevation of one of the valves for closing the admission-ports to the supply and exhaust and opening communication between the ends of the cylinder. Fig. 4 is a side elevation, partly in vertical section, and Fig. 5 a transverse section on the line $x\ x$, Fig. 4, showing how my invention may be applied to an existing engine. Fig. 6 is a vertical longitudinal central section illustrating a modification of my said invention, wherein racing is prevented by closing the ordinary cylinder-ports and putting both ends of the cylinder in communication with the valve-casing through additional ports. Fig. 7 is a vertical longitudinal central section of a modification wherein a kind of piston-valve is used. Fig. 8 is a detail view of the means for oscillating the valve exhibited in Fig. 7. Figs. 9 and 10 are vertical longitudinal sectional views showing other arrangements of a piston-valve, and Figs. 11 and 12 are longitudinal sectional views showing further modifications hereinafter explained.

$a\ a$ are the cylinders.
$b\ b'$ are the admission-ports.
$c\ c$ are the slide-valves.

The ports $b\ b'$ of each cylinder are connected by a pipe or passage $d$, and in the said ports are arranged suitable valves $e\ e'$, whereby the said ports may be closed when necessary to prevent the flow of steam through the same from the steam-chest or valve-casing and also to cut off communication between these ports and the exhaust. These valves are so constructed and arranged that simultaneously with the closing of the said ports to the steam supply and exhaust the said valves will open communication between the said ports through the said pipe or passage $d$, as shown in Fig. 1$^a$; so that the steam in the cylinder, while being retained therein, will be forced from end to end thereof alternately in either direction, as above mentioned, through the pipe or passage $d$. For controlling the said valves I can employ any well-known or other suitable form of governor, whether operated by the increase of speed of the engine or by the varying height of a column of water in a well or tube fixed in any desirable part of the vessel or otherwise.

In the arrangement shown in Fig. 2 the valves $e\ e'$ are provided with arms or levers $g\ g'$, which are connected by rods or links $h$. One of the said valves $e$ is provided with another arm or lever $j$, which may with advantage be connected by a rod or link $k$ with a "Dunlop" or other suitable governor, or, by preference, with one governor driven by the engine itself, and with another governor actuated by the varying column of water in a well or tube communicating with the water outside the ship. The other plug, $e$, is provided with an arm or lever $j'$, which is connected by a rod or link $h'$ with the said arm or lever $j$. By these means each of the valves $e$ can be turned in one direction and the corresponding plug $e'$ simultaneously turned in the reverse direction by the said governor or governors. I prefer to connect the said valves through the rod or link $k$ with the piston of a steam or hydraulic or pneumatic cylinder, the distribution of the fluid to which is controlled by the said governor or governors.

To provide for varying the area of the pipe or passage $d$, through which the steam is compelled to flow alternately in either direction for the purpose above specified, a plug or valve $f$ is arranged in combination with each of the pipes or passages $d$. These plugs or valves should be connected with a speed-governor actuated by the engine itself, so that any undue increase in the speed of the engine will effect the closing of the pipe or passage $d$ to the required extent, as indicated in Fig. 1ª, and thus increase the resistance to the flow of steam through the same.

The internal resistance to the movement of the engine will thus be varied in such a manner as to efficiently regulate the speed of the engine.

In the arrangement shown in Fig. 2 each of the plugs or valves $f$ is provided with an arm or lever $l$, and these levers are connected by a rod or link $m$. One of the said levers is also connected by means of a rod or link $m'$ with a bell-crank lever $n$, pivoted at $n'$ to a bracket attached to a bulkhead or to any other convenient support. The said bell-crank lever is also connected by a rod or link $p$ with the piston-rod $q'$ of a steam-cylinder $q$, the slide-valve of which is controlled by a governor $r$, (for example, what is known as a "Durham velometer,") driven from the engine-shaft $s$.

In the modification of my invention illustrated in Figs. 4 and 5 the pipe or passage $d$ is formed in a casting $d'$, secured to the exterior of the cylinder, and suitable holes are bored in the said casting and in the cylinder to receive the valves $e\ e'$, and a suitable hole is also bored in the said casting to receive the plug or valve $f$.

The valves $e\ e'$ are formed and arranged as shown in Figs. 3 and 5, the ends of each valve working in stuffing-boxes $t\ t'$, and the said valves being held in place by means of nuts $u\ u'$.

The operation of my improved apparatus is as follows, that is to say: When the cylinders are completely shut off or isolated from the steam supply and exhaust, and the two ends of each cylinder are put in communication through the pipes or passages $d$, as above mentioned, it is evident that, instead of the momentum of the moving parts being greatly increased by the steam contained in the engine, (during such time as diminished resistance is offered to the movement of the propeller,) the motion of the engine will be resisted or retarded.

The apparatus is to be so arranged and adjusted that, when the resistance to the rotation of the propeller is diminished to such an extent as to cause any undesirable acceleration of the engine, the valves $e\ e'$ will be turned so as to close the admission-ports to the supply and exhaust and at the same time open the pipe or passage $d$ for connecting the ends of the cylinder, as shown in Fig. 1ª. If, under these conditions, the speed of the engine should not be sufficiently checked, the governor $r$ will turn the plugs or valves $f$ so as to partially close the pipes or passages $d$, as indicated in Fig. 1ª, thus diminishing the effective area of the same and increasing the internal resistance to the movement of the engine. It will therefore be seen that by my invention undue acceleration or racing of an engine will be effectually prevented or very greatly diminished.

A further advantage afforded by my said invention is that, as soon as the valves in the admission-ports are moved back to their normal position, the engine will be under practically the same conditions as it was before the said ports were closed to the supply and exhaust and connected with each other as above mentioned, and steam contained in the engine will at once be available for driving the same. Moreover, should the engine-shaft break, great resistance will at once be offered to movement of the engine.

In the modification of my invention illustrated in Fig. 6 the cylinder $a$ is provided with additional steam-ports $v\ v'$, which, under ordinary conditions, are closed by the valves $e\ e'$, as shown. The said valves, when turned to close the ports $b\ b'$, simultaneously open communication between the ends of the cylinder and the valve-casing through the said ports $v\ v'$. The two ends of the cylinder can thus be put in communication with the steam supply after the ports $b\ b'$ are closed, thus establishing equilibrium of pressure in both ends of the cylinder.

In Figs. 7 and 8 I have shown another modification of my invention wherein the distributing-valve $c$ is a kind of piston-valve. In this case I provide for turning the valve about its axis through an angle of one hundred and eighty degrees, or thereabout, for the purpose of preventing racing of the engine. The valve $c$ (shown in Fig. 7) is so constructed that when it is thus turned the part $c^3$ of the said valve will keep the exhaust-port of the cylinder covered at all times during the travel of the valve, while the ports $b\ b'$ will, at all times during such travel, be in communication with each other through a port or passage $c^4$ in the said valve. There will then be either equilibrium of pressure in both ends of the cylinder, or more or less resistance to the flow of the steam from end to end of the cylinder, according to the transverse sectional area of the passage $c^4$ and to the angle through which the said valve is turned about its axis. To permit the turning of the valve $c$, (shown in Fig. 7,) the said valve is made with a hollow or tubular stem $c^5$, and is fitted upon the valve-rod $c^6$ in such a manner that, while it is free to be rotated thereon, it must participate in the to-and-fro movement thereof. The turning of the valve $c$ may be effected by any suitable means. In the arrangement shown in Figs. 7 and 8 the tubular stem $c^5$ of the said valve has fixed upon it a toothed segment $w$, which is geared with a rack $y$, connected with the piston of a steam-cylinder controlled by a governor, or with other suitable means for imparting the required longitudinal movement to the said rack. The rack $y$ is provided with projections $y'$ $y^2$, so that, when the said rack has been moved through the requisite distance in either direction to effect the turning of the valve as required, one or other of these projections will come into contact with the flat surface of the toothed segment $w$ and thus arrest the movement of the said rack. The teeth of the rack $y$ are made of sufficient width to permit the required travel of the valve without moving the toothed segment $w$ out of gear with the said rack.

Fig. 9 shows another arrangement in which a piston-valve $c$ is used and in which additional ports $v$ $v'$ are provided. The valve $c$ is in this case so constructed that when the said valve is turned as above explained the exhaust-port will be kept covered by the part $c^3$ of the said valve, while communication between the ends of the cylinder and the steam supply will be maintained at all times during the travel of the valve through two or more of the ports $b$ $b'$ $v$ $v'$. The ports $v$ $v'$ are covered, in the normal position of the valve $c$, by the parts $c^7$ of the said valve.

In Fig. 10 I have shown a further modification of my said invention wherein a piston-valve is used. In this modification, when the valve is turned to prevent racing, the part $c^3$ of the said valve keeps the exhaust-port covered, while leaving the ports $b$ $b'$ uncovered at all times during the travel of the said valve. The said ports $b$ $b'$ are thus both put in communication with the valve-casing, and equilibrium of pressure in both ends of the cylinder is established.

In Figs. 11 and 12 I have shown two arrangements in which the distributing-valve $c$ is an oscillating valve arranged within a tubular valve $z$, which is provided with suitable means, controlled by a governor, whereby it will be turned about its axis to prevent racing of the engine.

In the arrangement shown in Fig. 11 the steam is admitted to the interior of the valve $z$ through a port $z'$, and this valve is also provided with ports $z^2$ $z^3$ $z^4$, which, when the said valve $z$ is in the position shown, correspond with the admission and exhaust ports of the cylinder. Another port or passage $z^5$ is, moreover, formed in the valve $z$ for the purpose of putting the ports $b$ $b'$ in communication with each other when the said valve is turned through an angle of about one hundred and twenty degrees. It will be seen that this valve $z$, when thus turned, covers the steam-inlet $z^6$ and also the cylinder exhaust-port. Communication between the cylinder and the steam supply and exhaust is thus cut off, and the two ends of the cylinder at the same time put in communication with each other through the port $z^5$, the cross-sectional area of which can be varied by turning the said tubular valve about its axis.

In the arrangement shown in Fig. 12 the valve $c$ is tubular, and the steam is admitted to the interior thereof at one end of the said valve. The said valve $c$ may, if desired, be split, as at $c^8$, so that the steam-pressure in the said valve will tend to expand it and thus maintain a fluid-tight joint between this valve and the interior of the valve $z$. The valve $z$ in this arrangement is operated substantially as above described with reference to Fig. 11.

It is obvious that any other suitable means may be used for operating the valves above described, or other suitable valves, for the purposes specified.

I claim—

1. The combination, with an engine-cylinder, of valves adapted to simultaneously cut off communication between both ends of such cylinder and the exhaust-port and exhaust-space thereof, and at the same time open communication between the two ends of said cylinder, substantially as, and for the purposes, hereinbefore described.

2. The combination, with an engine-cylinder, of valves adapted to simultaneously cut off communication between both ends of such cylinder and the steam-chest and exhaust-port thereof, and at the same time open communication between the two ends of said cylinder, substantially as, and for the purposes, hereinbefore described.

3. The combination with an engine-cylinder, of valves in the admission ports or passages thereof, a supplementary port or passage connecting the said admission ports or passages, and a valve for varying the cross-sectional area of the said supplementary port or passage in accordance with variations in the speed of the engine, substantially as, and for the purposes set forth.

4. The combination with an engine-cylinder, of a pipe or passage connecting the admission-ports thereof, valves located at the junction of said pipe or passage with said admission-ports, whereby communication between the cylinder and the steam-chest and exhaust-port may be cut off and communication between the ends of the cylinder and said pipe or passage simultaneously opened, and means for operating the said valves, substantially as, and for the purposes above set forth.

5. The combination with the cylinder, of the pipe or passage $d$ connecting the admission-ports thereof a valve in the said pipe or passage, valves $e$, $e'$ located at the junction of said connecting pipe or passage with said admission-ports, and means for controlling the action of said valves, substantially as, and for the purposes set forth.

OWEN JONES.

Witnesses:
DAVID YOUNG,
JOHN T. KNOWLES.